(12) United States Patent
Kulkarni et al.

(10) Patent No.: US 11,726,579 B2
(45) Date of Patent: Aug. 15, 2023

(54) PHYSICAL KEYBOARDS FOR MULTI-DISPLAY COMPUTING DEVICES

(71) Applicant: Intel Corporation, Santa Clara, CA (US)

(72) Inventors: Shantanu D. Kulkarni, Hillsboro, OR (US); Jeff Ku, Taipei (TW); James Okuley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/553,294

(22) Filed: Dec. 16, 2021

(65) Prior Publication Data

US 2022/0107693 A1    Apr. 7, 2022

Related U.S. Application Data

(63) Continuation of application No. 16/713,605, filed on Dec. 13, 2019, now Pat. No. 11,237,643.

(51) Int. Cl.
*G06F 3/02* (2006.01)
*G06F 1/16* (2006.01)

(52) U.S. Cl.
CPC ............ *G06F 3/0227* (2013.01); *G06F 1/166* (2013.01); *G06F 1/1666* (2013.01)

(58) Field of Classification Search
None
See application file for complete search history.

(56) References Cited

U.S. PATENT DOCUMENTS

| | | |
|---|---|---|
| 6,003,052 A | 12/1999 | Yamagata |
| 10,031,559 B1 | 7/2018 | Hamel et al. |
| 10,120,420 B2 | 11/2018 | Bathiche et al. |
| 10,254,803 B1 * | 4/2019 | Quinn ............... G06F 1/1688 |
| 10,955,877 B2 | 3/2021 | Ku et al. |
| 11,237,643 B2 | 2/2022 | Kulkarni et al. |
| 2004/0001306 A1 | 1/2004 | Oakley |
| 2015/0277499 A1 | 10/2015 | MacDonald |
| 2016/0202733 A1 | 7/2016 | Ho |
| 2017/0139439 A1 | 5/2017 | Okuley et al. |
| 2017/0169741 A1 | 6/2017 | Lim |
| 2017/0220071 A1 | 8/2017 | Elliott et al. |
| 2017/0251087 A1 | 8/2017 | Lumbard |
| 2017/0257131 A1 | 9/2017 | Debates et al. |
| 2017/0300089 A1 | 10/2017 | Hampton et al. |
| 2017/0329370 A1 | 11/2017 | Han |
| 2017/0357473 A1 | 12/2017 | Kim |
| 2018/0046225 A1 | 2/2018 | Amarilio et al. |
| 2018/0077810 A1 | 3/2018 | Moon et al. |
| 2018/0108330 A1 | 4/2018 | Wallace et al. |
| 2018/0188775 A1 | 7/2018 | Perelli et al. |
| 2018/0188780 A1 | 7/2018 | Perelli |

(Continued)

OTHER PUBLICATIONS

Intel Copper Harbor 12, last retrieved Apr. 13, 2020, 1 page.

(Continued)

*Primary Examiner* — Stephen T. Reed
(74) *Attorney, Agent, or Firm* — Hanley, Flight & Zimmerman, LLC

(57) ABSTRACT

Apparatus, devices, systems, methods, and articles of manufacture are disclosed for physical keyboards with multi-display computing devices. An example computing device includes a first display, a second display, and a keyboard.

22 Claims, 12 Drawing Sheets

(56) References Cited

U.S. PATENT DOCUMENTS

| | | |
|---|---|---|
| 2018/0196473 A1 | 7/2018 | Smith et al. |
| 2018/0210504 A1 | 7/2018 | Moser |
| 2018/0210508 A1 | 7/2018 | Aurongzeb et al. |
| 2018/0292860 A1 | 10/2018 | Siddiqui |
| 2018/0329453 A1 | 11/2018 | Elias |
| 2019/0121399 A1 | 4/2019 | Ku et al. |
| 2019/0129516 A1 | 5/2019 | Morrison et al. |
| 2019/0220064 A1 | 7/2019 | Park et al. |
| 2019/0258300 A1 | 8/2019 | Gerardi |
| 2020/0117284 A1 | 4/2020 | Kulkarni et al. |
| 2020/0233538 A1* | 7/2020 | Aurongzeb ............ G06F 1/166 |
| 2020/0341515 A1 | 10/2020 | Moser et al. |
| 2021/0173447 A1 | 6/2021 | Ku et al. |

OTHER PUBLICATIONS

Lenovo Yogabook 2, last retrieved Apr. 13, 2020, 1 page.
Pegatron Magneto, last retrieved Apr. 13, 2020, 1 page.
Surface Pro and keyboard, last retrieved Apr. 13, 2020, 1 page.
IPad and keyboard, last retrieved Apr. 13, 2020, 1 page.
European Patent Application, "Extended Search Report," issued in connection with EP patent application No. 20194492.3, dated Feb. 23, 2021, 8 pages.
United States Patent and Trademark Office, "Notice of Allowance," issued in connection with U.S. Appl. No. 16/713,605, dated Sep. 27, 2021, 8 pages.
United States Patent and Trademark Office, "Non-Final Office action," issued in connection with U.S. Appl. No. 16/713,605, dated Jan. 25, 2021, 19 pages.
United States Patent and Trademark Office, "Final Office action," issued in connection with U.S. Appl. No. 16/713,605, dated Jun. 17, 2021, 23 pages.
United States Patent and Trademark Office, "Advisory action," issued in connection with U.S. Appl. No. 16/713,605, dated Aug. 11, 2021, 5 pages.
European Patent Office, "Communication pursuant to Article 94(3) EPC", issued in connection with European Patent Application No. 20194492, dated Mar. 13, 2023, 6 pages.

* cited by examiner

PHYSICAL KEYBOARDS FOR MULTI-DISPLAY COMPUTING DEVICES

RELATED APPLICATION

This patent arises from a continuation of U.S. patent application Ser. No. 16/713,605, which was filed on Dec. 13, 2019. U.S. patent application Ser. No. 16/713,605 is hereby incorporated herein by reference in its entirety. Priority to U.S. patent application Ser. No. 16/713,605 is hereby claimed.

FIELD OF THE DISCLOSURE

This disclosure relates generally to computing devices, and, more particularly, to physical keyboards for multi-display computing devices.

BACKGROUND

Some multi-display computing devices include a software-based keyboard that appears on one of the displays of the computing device to enable the user to type. User experience typing on a software-based keyboard is typically unsatisfactory compared to a physical keyboard.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Users of computing devices such as laptops, tablets, and flexible display devices that include dual displays or multiple displays have been hesitant to adopt form factors that implement a software-based keyboard that appears on a screen or display of the computing device. As used herein "dual display" means two displays, and "multiple display" means two or more displays. The disclosures herein related to dual displays apply to multiple displays and vice versa. In addition, "screen" and "display" maybe used interchangeably. A software-based keyboard appearing on the display of the computing device is two-dimensional and fails to provide a satisfactory typing experience for the user. Some purveyors of such computing devices offer physical keyboards that are separately sold as accessories for the computing device, which adds costs. In addition, these accessories are stowed separately, increasing the likelihood the accessories are misplaced or lost.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Disclosed herein are example multi-display computing devices that have example physical keyboards that are stowable with the device. The physical keyboards provide users with a gratifying typing experience as the users are able to depress physical keys on the keyboard. In addition, users are able to type more quickly on a physical keyboard than on a software-based keyboard. In some examples, the keyboards hinged to a support plate, stowable within or under one of the displays, and deployable on or over another one of the displays. In some examples, one of the displays is hinged to a support plate, stowable under another display, and deployable on or over a physical keyboard. Deployment and stowage of the keyboards or a second display enable the computing devices to switch between single display and multiple display modes.

Figure 1A:
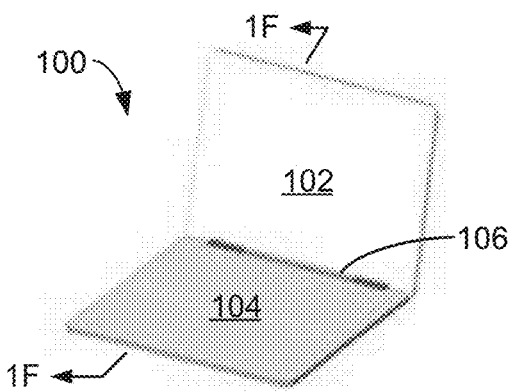
FIG. 1A is a schematic illustration of a front perspective view of an example dual display computing device with an example physical keyboard in accordance with the teachings of this disclosure where the computing device is in an open position and the keyboard is in a stowed position.

FIG. 1A is a schematic illustration of a front perspective view of an example dual display computing device 100 with an example physical keyboard. In FIG. 1A, the computing device 100 is in an open position, and the keyboard is in a stowed position. Thus, the keyboard is not visible in FIG. 1A. The computing device 100 includes an example first display 102 and an example second display 104. The first display 102 and the second display 104 are coupled via means for coupling the first display 102 and the second display 104 including, for example, an example first hinge 106. In some examples, the means for coupling includes a flexible connection. In some examples, the means for coupling includes joints. In some examples, the means for coupling includes pins. In some examples, the means for coupling include gears and/or cogs. FIG. 1A shows the computing device 100 in position for use as a dual screen device.

Figure 1B:
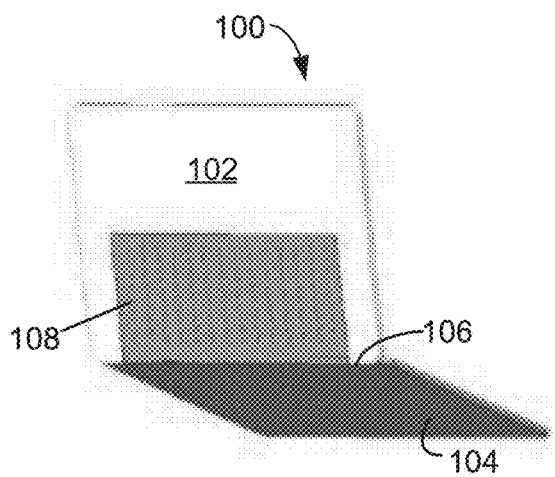
FIG. 1B is a rear perspective view of the computing device of FIG. 1A.

FIG. 1B is a rear perspective view of the computing device 100. The computing device 100 includes an example support plate 108. The support plate 108 is coupled to the second display 104 via the first hinge 106. In some examples, the support plate 108 and the second display 104 are coupled via a hinge that is different than the first hinge 106. In other words, in some examples, the first display 102 and the second display 104 are coupled via the first hinge 106, and the support plate 108 and the second display 104 are coupled via a different hinge.

Figure 1C:
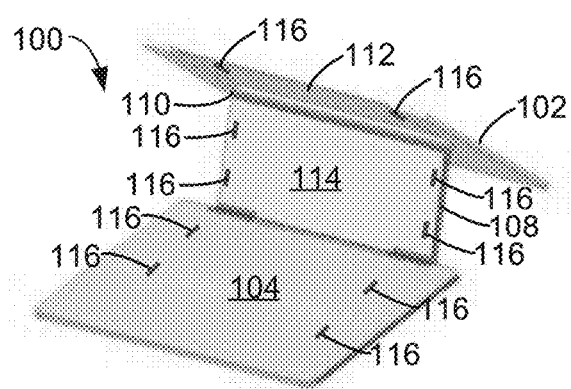
FIG. 1C is a front perspective view of the computing device of FIG. 1A with an example first display partially rotated about an example support plate exposing a rear side of the physical keyboard.

FIG. 1C is a front perspective view of the computing device of FIG. 1A with the first display 102 partially rotated about the support plate 108. The first display 102 and the support plate 108 are coupled via means for coupling the first display 102 and the support plate 108 including, for example, an example second hinge 110. In some examples, the means for coupling includes a flexible connection. In some examples, the means for coupling includes joints. In some examples, the means for coupling includes pins. In some examples, the means for coupling include gears and/or cogs. In this example, the second hinge 110 is positioned in a middle or center portion of the first display 102 and at the top of the support plate 108. In this example, the support plate 108 has a height that is less than the height of the first display 102.

In the example shown in FIG. 1C, a rear side of the first display 102 includes a cavity or recess 112. The support plate 108 is removably positionable in the cavity 112. In some examples, such as shown in FIG. 1B, the first display 102 is positioned around the support plate 108 such that the support plate 108 may be visible from the rear side of the first display 102. When the first display 102 is rotated about the second hinge 110, and example physical keyboard 114 is exposed and accessible. FIG. 1C shows a rear or bottom side of the physical keyboard 114. The physical keyboard 114 is coupled to the support plate 108 and the second display 104 via means for coupling the physical keyboard 114, the support plate 108, and the second display 104 including, for example, the first hinge 106. Thus, in some examples, the physical keyboard 114 is hingedly coupled to the support plate 108 about an axis of rotation, and the second display 104 is hingedly coupled to the support plate 108 about the same axis of rotation. Throughout this description, the disclosure of a hinge is a disclosure of an axis of rotation.

In other examples, the physical keyboard 114, the support plate 108, and the second display 104 may be coupled via a hinge that is not the same as the hinge that couples the first display 102 and the second display 104. Thus, in some examples, the physical keyboard 114 and the second display 104 are hingedly coupled about an axis of rotation relative to the support plate 108, and the second display 104 is hingedly coupled to the first display 102 about a different axis of rotation.

Also, in some examples, the physical keyboard 114 and the support plate 108 are coupled via a hinge, and the support plate 108 and the second display 104 are coupled via a different hinge. Thus, in some examples the physical keyboard 114 and the support plate 108 are coupled about an axis of rotation, and the support plate 108 and the second display 104 are coupled about a different axis of rotation.

In some examples, there are three mechanical connections that include the connection between the first display 102 and the support plate 108, the connection between the physical keyboard 114 and the support plate 108, and the connection between the support plate 108 and the second display 104. In some examples the first display 102 is coupled to the second display 104 via the support plate 108. The physical keyboard 114 is stowable behind the first display 102 including, for example, in the cavity 112. The physical keyboard 114 remains physically coupled to the computing device 100.

Figure 1D:
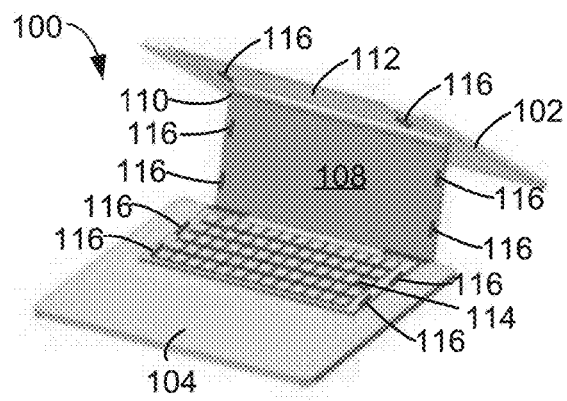
FIG. 1D is a front perspective view of the computing device of FIG. 1C with the physical keyboard rotated onto a surface of an example second display.
Figure 1E:
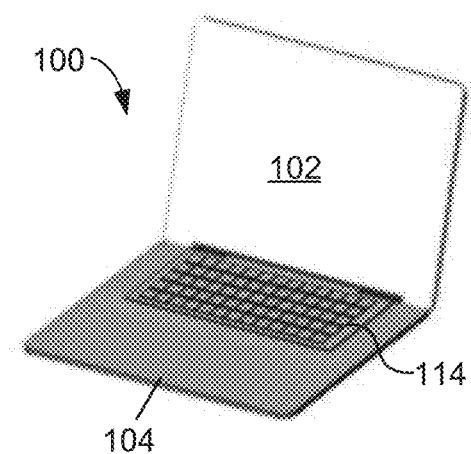
FIG. 1E is a front perspective view of the computing device of FIG. 1A with the physical keyboard rotated onto the surface the second display.

FIG. 1D is a front perspective view of the computing device 100 with the physical keyboard 114 rotated onto or above the surface of the example second display 104. In this view, the physical keyboard 114 is in the in-use or deployed position, while the first display 102 is partially rotated about the second hinge 110. In FIG. 1E, the first display 102 is rotated about the second hinge 110 to the in-use position. In this position, the first display 102 covers the support plate 108. FIG. 1E shows the computing device 100 in position for use with the physical keyboard 114.

In some examples, there are additional means for coupling one or more of the first display 102, the second display 104, the support plate 108, and/or the physical keyboard 114 including, for example, example magnets 116 and/or complementary magnetic elements such as, for example, metal plates. In some examples, there are magnets and/or magnetic elements 116 disposed within the second display 104 and on the bottom of the physical keyboard 114 that are releasably engaged to couple the physical keyboard 114 and the second display 104 to hold the physical keyboard 114 in the deployed position. In some examples, there are magnets and/or magnetic elements 116 disposed on the support plate 108 and on the rear surface of the first display 102 are releasably engaged to couple the support plate 108 and the first display 102 when the physical keyboard 114 is in the deployed position. In some examples, there are magnets and/or magnetic elements 116 disposed on the support plate 108 and on the top of the physical keyboard 114 that are releasably engaged to couple the physical keyboard 114 and the support plate 108 to hold the physical keyboard 114 in the stowed position. In some examples, there are magnets and/or magnetic elements 116 disposed on the rear surface of the first display 102 and on the bottom of the physical keyboard 114 that are releasably engaged to couple the physical keyboard 114 and the first display 102 when the physical keyboard 114 is in the stowed deployed position. The same magnets and/or magnetic elements 116 may be used for the different magnetic couplings disclosed herein. In addition, the number of magnets and/or magnetic elements 116 included in the computing device 100 may be different than the number shown in FIGS. 1C and 1D. For example, there may be one magnet and/or magnetic element 116 in or on each of the first display 102, the second display 104, the support plate 108, and/or the physical keyboard 114. Other examples may include three or more magnets and/or magnetic elements 116. Some examples include a different number of magnets and/or magnetic elements 116 among the elements of the computing device 100. The magnets and/or magnetic elements 116 may be located on one or more side edges, a front edge, a rear edge, a middle portion and/or any other suitable location(s) on or in the elements of the computing device 100 to perform the coupling functions disclosed herein.

In some examples, FIG. 1E shows the computing device 100 for use as a single screen device. In other examples, FIG. 1E shows the computing device 100 for use with the first display 102, the physical keyboard 114, and portions of the second display 104. For example, the portions of the second display 104 that are not covered by the physical keyboard 114 may be used to present content to the user. In some examples, the screen of the second display 104 around the physical keyboard 114 is customized for keyboard uses.

Figure 1F:
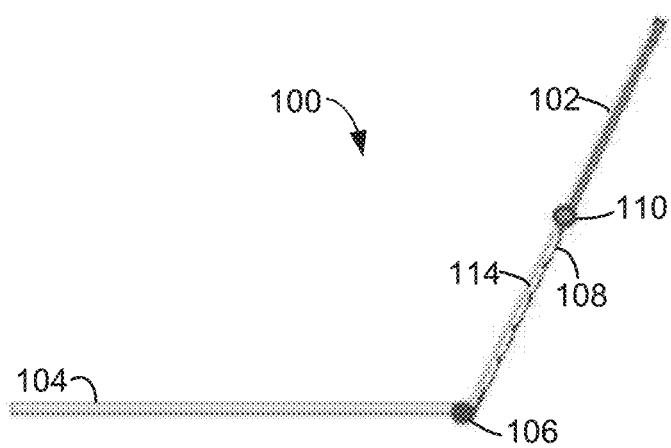
FIG. 1F is a cross-sectional view of the computing device taken along the 1F-1F line of FIG. 1A.

FIG. 1F is a cross-sectional view of the computing device 100 taken along the 1F-1F line of FIG. 1A. FIG. 1F shows the physical keyboard 114 in the stowed position. The physical keyboard 114 is rotated upward and the keys of the physical keyboard 114 face the support plate 108. The physical keyboard 114 is disposed within the cavity 112. The thickness and/or height of the physical keyboard 114 is less than the thickness of the first display 102.

Figure 1G:
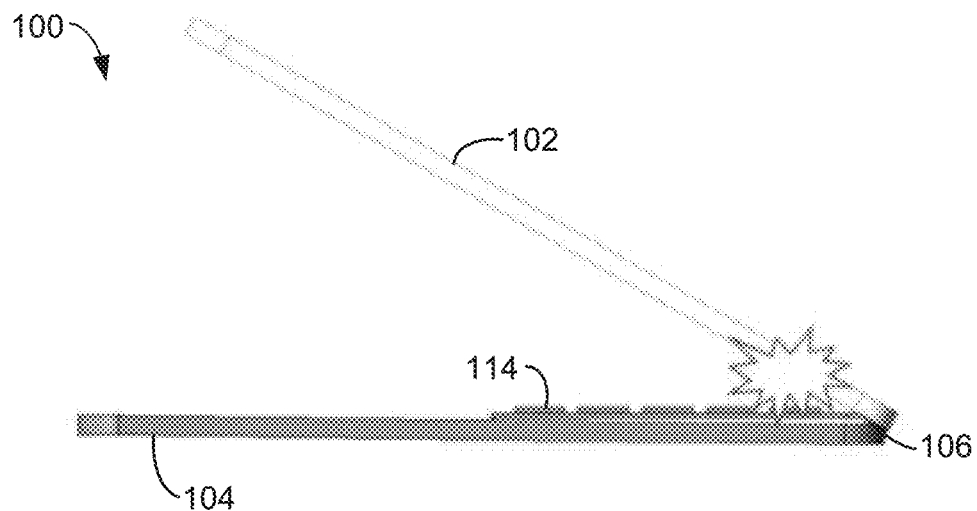
FIG. 1G is a side view of the device of FIG. 1E with the first display in a partially closed position.

FIG. 1G is a side view of the computing device 100 with the first display 102 in a partially closed position and the physical keyboard 114 in the deployed position. In this example, the presence of the physical keyboard 114 on the second display 104 prevents the first display 102 from moving to the closed position. The contact between the first display 102 and the physical keyboard 114 reminds the user to stow the physical keyboard 114 before closing the computing device 100.

Figure 2A:
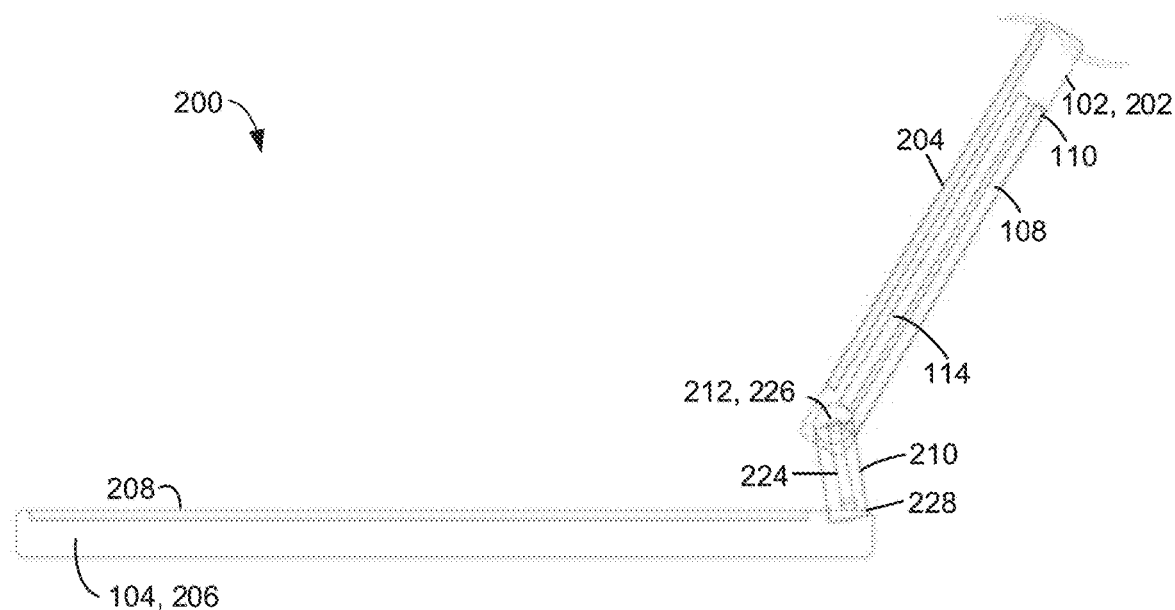
FIG. 2A is a schematic partial cross-sectional view of an example dual display computing device with an example physical keyboard in accordance with the teachings of this disclosure where the computing device is in an open position and the keyboard is in a stowed position.

FIG. 2A is a schematic partial cross-sectional view of an alternative example dual display computing device 200. The dual display device includes the first display 102, the second display 104, the support plate 108, the hinge 110 between the first display 102 and the support plate 108, and the physical keyboard 114. In FIG. 2A, the computing device 200 is in an open position and the physical keyboard 114 is in a stowed position.

FIG. 2A shows that the first display 102 includes an example first cover 202 and an example first screen 204. The second display 104 includes an example second cover 206 and an example second screen 208.

The computing device 200 also includes an example intermediary panel 210. The intermediary panel 210 connects the first display 102 and the second display 104. The intermediary panel 210 elevates the first display 102. In this example, the first display 102 is rotatably coupled to the intermediary panel 210 via a hinge 212. In this example, the intermediary panel 210 is fixedly coupled to the second display 104.

Figure 2B:
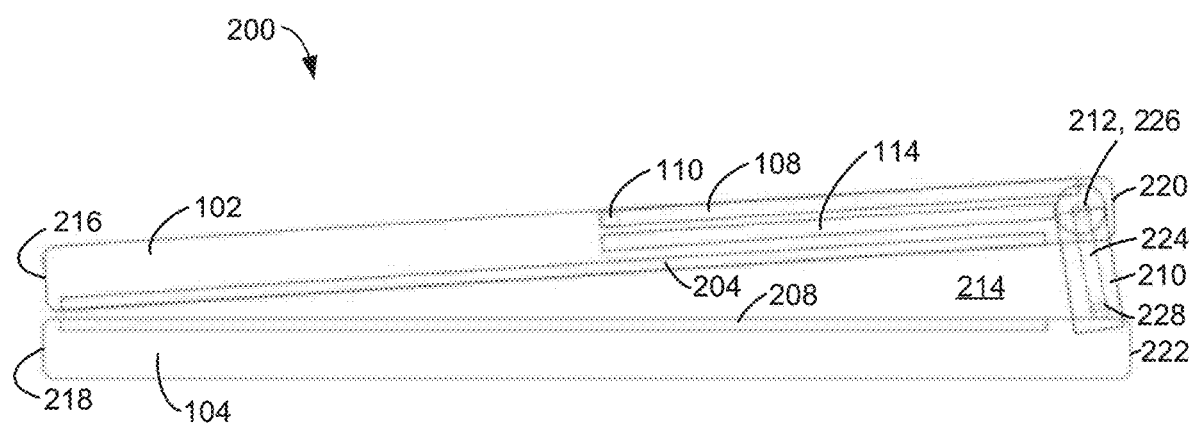
FIG. 2B is a cross-sectional view of the device of FIG. 2A with an example first display in a closed position.

FIG. 2B is a cross-sectional view of the computing device 200 of FIG. 2A with the first display 102 in a closed position. In this view, the first display 102 has been rotated about the hinge 212. The intermediary panel 210 elevates the first display 102, which forms a triangular space 214 between the first display 102 and the second display 104. In the closed position, a first end 216 of the first display 102 (the end of the first display 102 further from the intermediary panel 210) moves toward or into contact with a first end 218 of the second display 104 (the end of the second display 104 further from the intermediary panel 210). A second end 220 of the first display 102 (the end of the first display 102 coupled to the intermediary panel 210) is spaced apart from a second end 222 of the second display 104 (the end of the second display 104 coupled to the intermediary panel 210). In some examples, the second end 220 of the first display 102 and the second end 222 of the second display 104 are spaced apart by a distance defined by the intermediary panel 210. For example, the distance may be defined by a height of the intermediary panel 210. In some examples, when the computing device 200 is in the closed position, the first end 216 of the first display 102 and the first end 218 of the second display 104 are separated a first distance, and the second end 220 of the first display 102 and the second end 222 of the second display 104 are separated a second distance, the second distance being greater than the first distance. In the illustrated example, the first cover 202 is positioned at an angle relative to the horizontal when the computing device 200 is in the close position.

The physical keyboard 114 is coupled to the intermediary panel 210 via an example linkage 224. In the illustrated example, the linkage 224 includes a dual axis chain or dual axis link. The linkage 224 includes an example first hinge or axis of rotation 226 and an example second hinge or axis of rotation 228. In some examples, the linkage 224 is a soft hinge that includes two fold lines. In some examples, when the physical keyboard 114 is in the stowed position, the first axis 226 is aligned with or coincident with the hinge 212 that couples the first display 102 and the intermediary panel 210. In the stowed position, the physical keyboard 114 is rotated about the first axis 226 and positioned in the first cover 202. When the physical keyboard 114 is in the stowed position, the linkage 224 is rotated about the second axis to position the linkage 224 in alignment with the intermediary panel 210 as shown in FIGS. 2A and 2B. In some examples, when the physical keyboard 114 is in the stowed position, the linkage 224 or a portion of the linkage 224 is positioned in the intermediary panel 210. In other examples, the linkage 224 is positioned over a surface of the intermediary panel 210 when the physical keyboard 114 is in the stowed position.

In some examples, the linkage 224 is without torque for holding the physical keyboard 114 in a position. Thus, the linkage 224 does not affect movement of the first display 102.

Figure 2C:
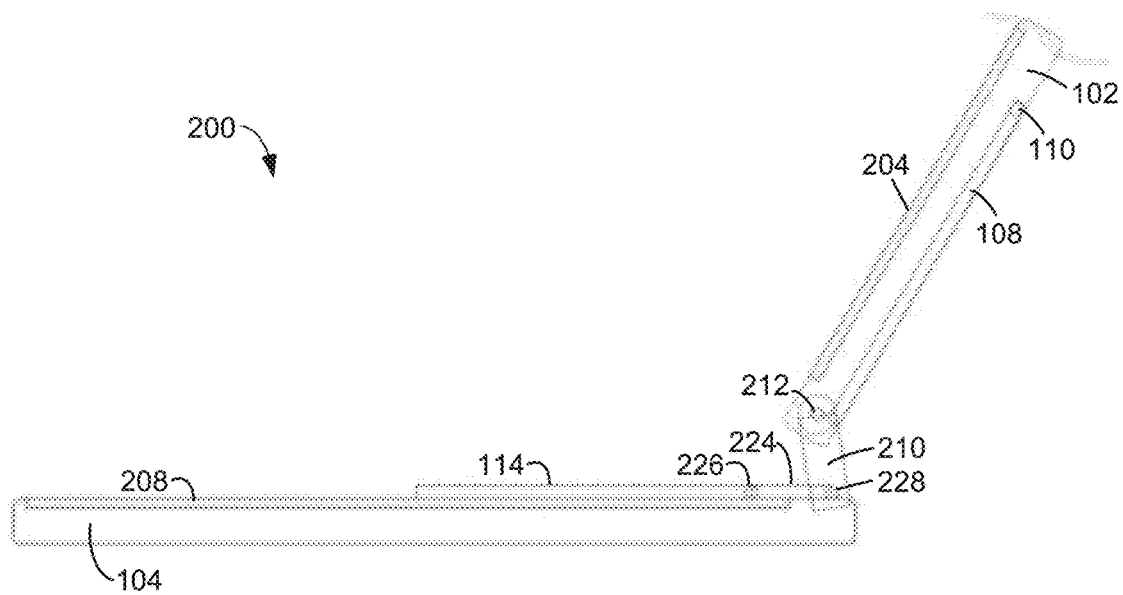
FIG. 2C is a schematic partial cross-sectional view of the computing device of FIG. 2A where the computing device is in an open position and the keyboard is in a deployed position.

FIG. 2C is a schematic partial cross-sectional view of the computing device 200 of FIG. 2A where the computing device 200 is in an open position and the physical keyboard 114 is in a deployed position. The physical keyboard 114 is shown in FIG. 2C deployed on and/or over the second screen 208. To move the physical keyboard 114 to the deployed position, the physical keyboard 114 is rotated about the first axis 226 and removed from the first cover 202. The linkage 224 is rotated about the second axis 228, which moves the first axis 226 out of alignment with the hinge 212 and moves the linkage 224 away from the intermediary panel 210. In this example, the physical keyboard 114 is movable about the first axis 226, the linkage 224 is movable about the second axis 228, and the first axis 226 is movable about the second axis 228. In this example, the first axis 226 is movable into and out of alignment with the first display 102 and/or the intermediary panel 210. In this example, the second axis 228 is stationary with regard to the position of the second axis 228 relative to the intermediary panel 210.

Figure 2D:
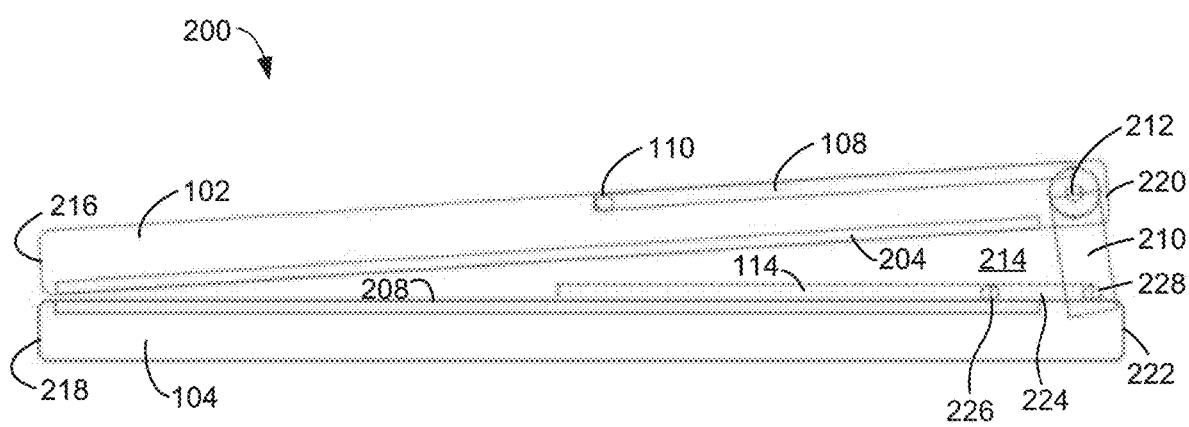
FIG. 2D is a cross-sectional view of the device of FIG. 2C with the first display in a closed position.

FIG. 2D is a cross-sectional view of the computing 200 with the first display 102 in the closed position while the physical keyboard 114 is in the deployed position. The triangular space 214 formed in part by the intermediary panel 210 provides a cavity for the physical keyboard 114. The triangular space prevents the physical keyboard 114 from obstructing movement of the first display 102 into the closed position. In this example, the user can close the computing device 200 without stowing the physical keyboard 114.

Figure 3A:
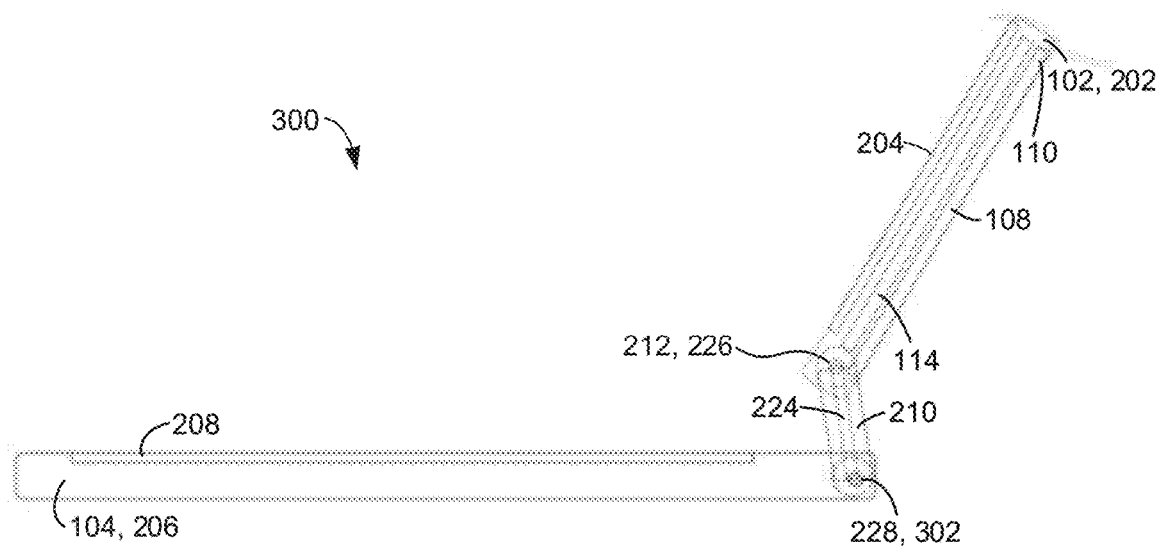
FIG. 3A is a schematic partial cross-sectional view of an example dual display computing device with an example physical keyboard in accordance with the teachings of this disclosure where the computing device is in an open position and the keyboard is in a stowed position.

FIG. 3A is a schematic partial cross-sectional view of another example dual display computing device 300 with the physical keyboard 114. In FIG. 3A, the computing device 300 is in the open position, and the physical keyboard 114 is in a stowed position. The computing device 300 is similar to the computing device 200 of FIG. 2A and includes the intermediary panel 210. In the example of FIG. 3A, the first display 102 is rotatably coupled to the intermediary panel via the hinge 212, and the intermediary panel 210 is rotatably coupled to the second display 104 via an example hinge 302. In the example illustrated in FIG. 3A, the hinge 302 is coincident with the hinge 228 of the linkage 224 that couples the physical keyboard 114 with the intermediary panel 210. In other examples, the hinge 302 and the hinge 228 may be offset.

Figure 3B:
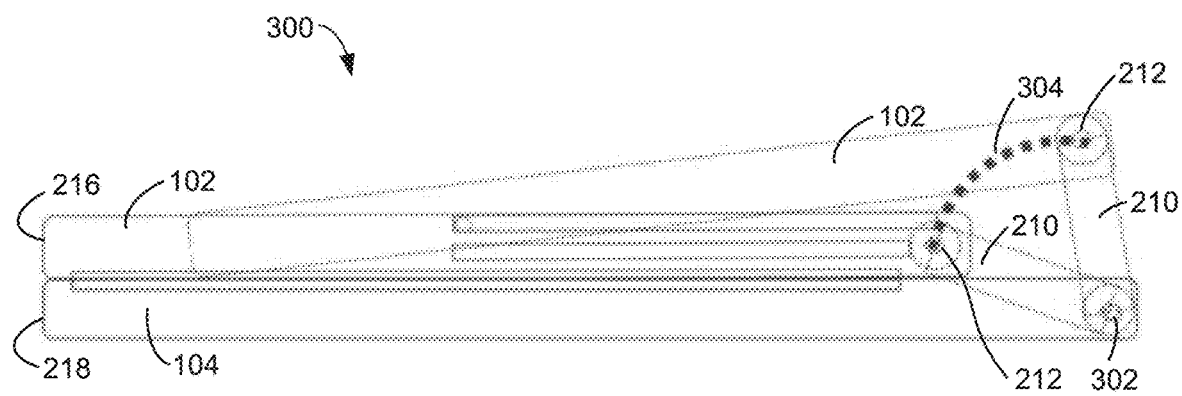
FIG. 3B is a cross-sectional view of the device of FIG. 3A with an example first display shown in phantom lines transitioning to a closed position and also shown in the closed position.
Figure 3C:
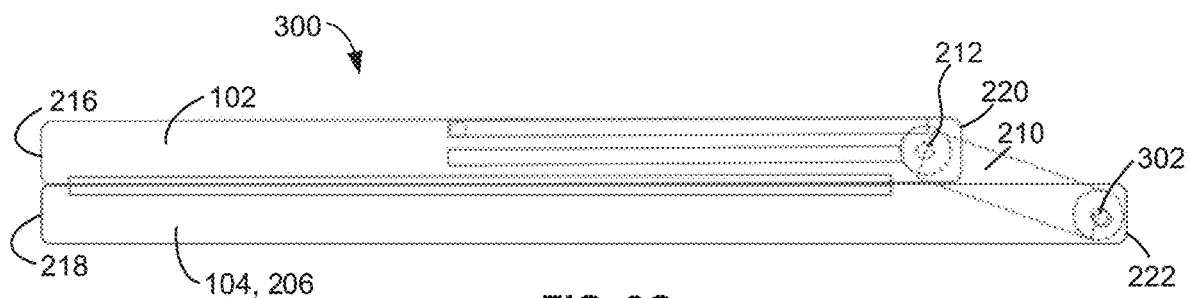
FIG. 3C is a cross-sectional view of the device of FIG. 3B in the closed position.

FIG. 3B is a cross-sectional view of the computing device 300 of FIG. 3A with the first display 102 shown in phantom lines transitioning to a closed position and also shown in the closed position. FIG. 3C is a cross-sectional view of the computing device 30 of FIG. 3B in the closed position. The hinge 302 enables the intermediary panel 210 to rotate about the axis of the hinge 302. As the intermediary panel 210 rotates, the hinge 212 moves from the elevated position shown in FIG. 3A to the lower position shown in FIG. 3C. The movement of the hinge 212 is shown by the dotted line 304. The movement of the hinge 212 enables the first display 102 to rest on the second display 104 when the computing device 300 is in the closed position shown in FIG. 3C. In this example, the height of the computing device 300 is not increased when the computing device 300 is in the closed position. In other words, the height of the computing device 300 of FIG. 3C is less than the height of the computing device 200 of FIG. 2B when the computing devices 200, 300 are in the respective closed positions.

In the example shown in FIGS. 3A-3C, the physical keyboard 114 is in the stowed position. In this example, when the physical keyboard 114 is in the stowed position, the hinge 226 moves with the hinge 212, the hinge 228 moves with the hinge 302, and the linkage 224 moves with the intermediary panel 210.

The example computing device 300 may have a first display 102 that has a shorter dimension than the computing device 200 of FIGS. 2A-2D. The first end 216 of the first display 102 and the first end 218 of the second display 104 are aligned when the computing device 300 is in the closed position. However, the second end 220 of the first display 102 and the second end 222 of the second display 104 are not aligned when the computing device 300 is in the closed position. The second end 220 of the first display 102 and the second end 222 of the second display 104 are offset when the computing device 300 is in the closed position. The second end 220 of the first display 102 and the second end 222 of the second display 104 are offset by a distance based on the intermediary panel 210. For example, the second end 220 of the first display 102 and the second end 222 of the second display 104 are offset by a distance equal to a width of the intermediary panel 210.

In some examples, the shape of the second cover 206 of the second display 104 is angled on the side closer to the intermediary panel 210. The angled shape may be a recess or a contour of the second cover 206. The angled shape accommodates or receives the intermediary panel 210 when the first display 102 is moved to the closed position.

Figure 3D:
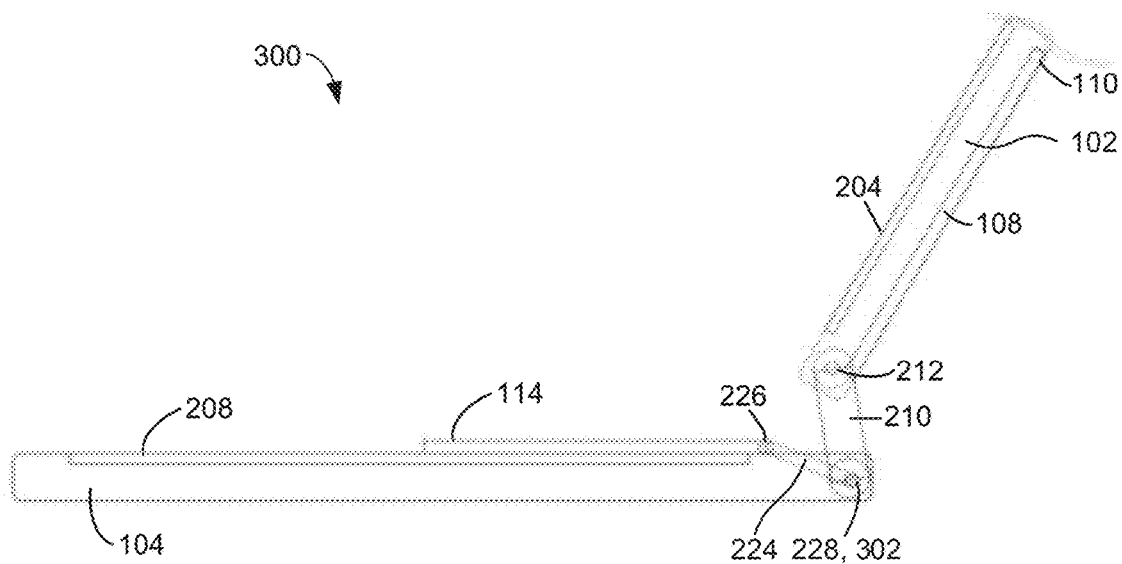
FIG. 3D is a schematic partial cross-sectional view of the computing device of FIG. 3A where the computing device is in an open position and the keyboard is in a deployed position.

FIG. 3D is a schematic partial cross-sectional view of the computing device 300 of FIG. 3A where the computing device 300 is in the open position and the physical keyboard 114 is in the deployed position. In the position shown in FIG. 3D, the linkage 224 is rotated about the hinge 228. The intermediary panel 210 is not rotated about the hinge 302, and the linkage 224 has been moved away from the intermediary panel 210. Also, the hinge 226 is moved away from the hinge 212.

Figure 3E:
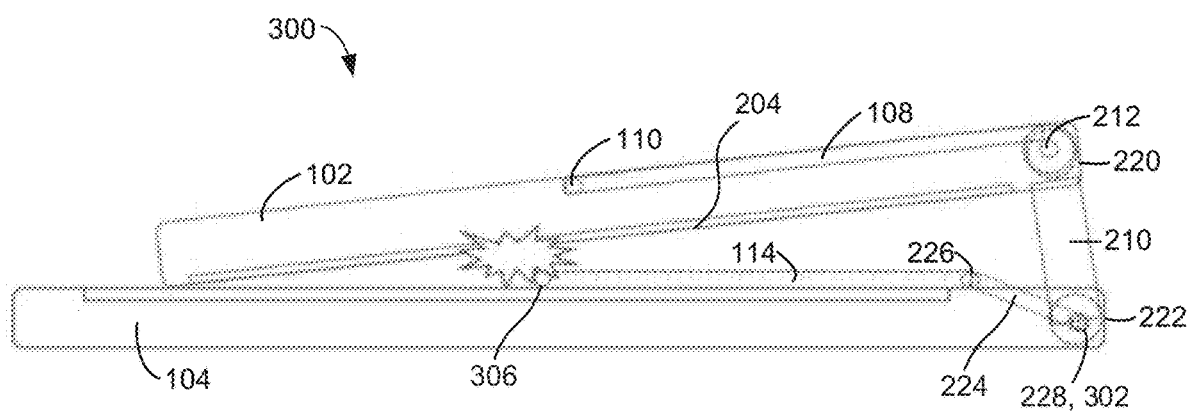
FIG. 3E is a cross-sectional view of the device of FIG. 3D with the first display in a partially closed position.

FIG. 3E is a cross-sectional view of the computing device 300 with the first display 102 in a partially closed position. As shown in FIG. 3E, when the physical keyboard 114 is in the deployed position, and the first display 102 is moved to the closed position, the first display 102 contacts the physical keyboard 114 and movement to the fully closed position is prevented. The prevention of further movement of the first display 102 reminds the user to stow the physical keyboard 114 before closing the computing device 300.

In some examples, the physical keyboard 114 includes an example stopper 306. In the example of FIG. 3E, the stopper 306 is coupled to an end of the physical keyboard 114. The stopper 306 may include a material such as, for example, rubber. The stopper 306 makes contact with the first display 102 when the first display 102 is moving to the closed position while the physical keyboard 114 is in the deployed position. The stopper 306 protects the first screen 204 from damage as force is applied to the first display 102 to close the computing device 300.

Figure 4A:
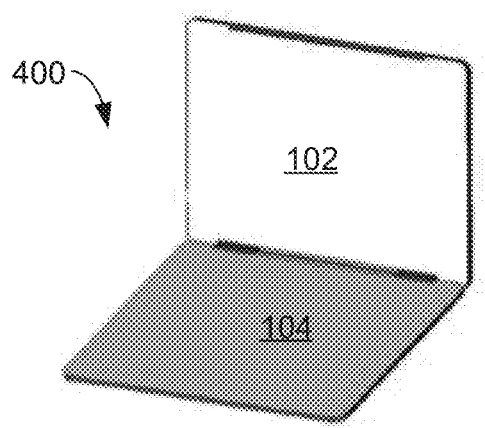
FIG. 4A is a schematic illustration of a front perspective view of an example dual display computing device with an example physical keyboard in accordance with the teachings of this disclosure where the computing device is in an open position and the keyboard is in a stowed position.
Figure 4B:
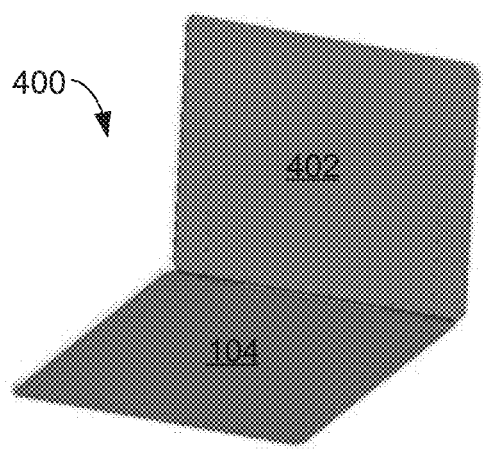
FIG. 4B is a rear perspective view of the computing device of FIG. 4A.
Figure 4C:
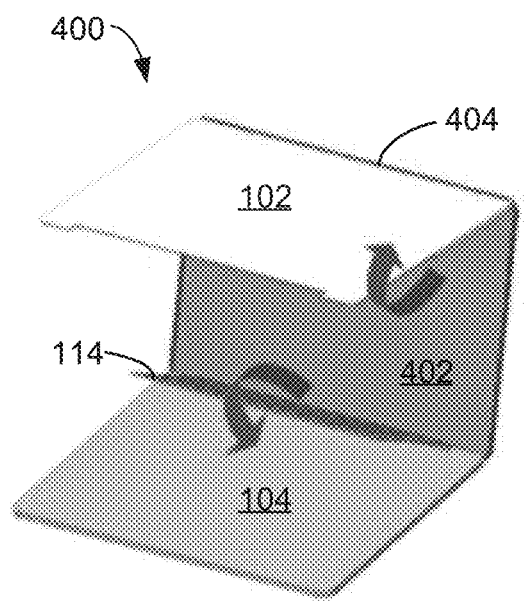
FIG. 4C is a front perspective view of the computing device of FIG. 4A with an example first display partially rotated about an example support plate and an example physical keyboard partially rotated to the deployed position.
Figure 4D:
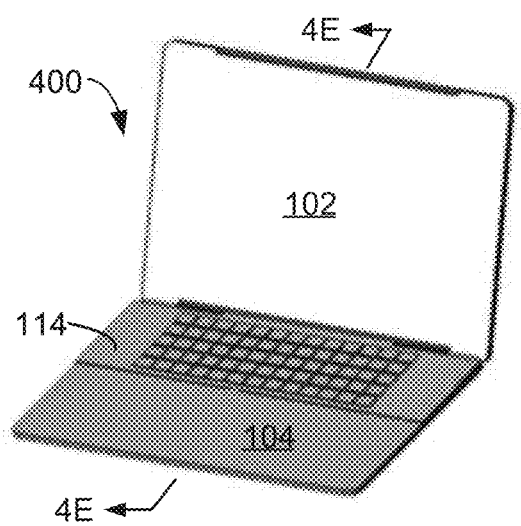
FIG. 4D is a front perspective view of the computing device of FIG. 4A with the physical keyboard rotated onto the surface of an example second display.

FIG. 4A is a schematic illustration of a front perspective view of an example dual display computing device 400 with the physical keyboard 114, where the computing device 400 is in the open position and the physical keyboard 114 is in the stowed position. FIG. 4B is a rear perspective view of the computing device 400. FIG. 4C is a front perspective view of the computing device 400 showing the first display 102 partially rotated about an example support plate 402. In this example, the support plate 402 extends substantially fully behind the first display 102. In some examples, the support plate 402 has the same or substantially the same length and height dimensions as the first display 102. In this example, the first display 102 is rotatably coupled to the support plate 402 about an example hinge 404. In this example, the hinge 404 is located at a top edge of the first display and a top edge of the support plate 402. FIG. 4C also shows the example physical keyboard 114 partially rotated to the deployed position. FIG. 4D is a front perspective view of the computing device 400 with the physical keyboard 114 rotated onto or above the second display 104.

Figure 4E:
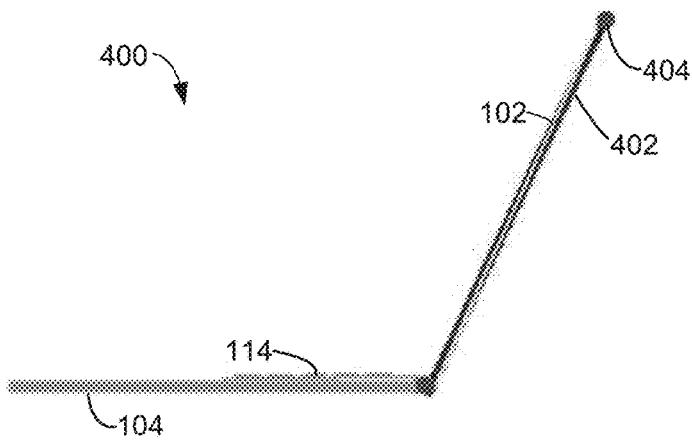
FIG. 4E is a cross-sectional view of the computing device of FIG. 4D taken along the 4E-4E line of FIG. 4D.
Figure 4F:
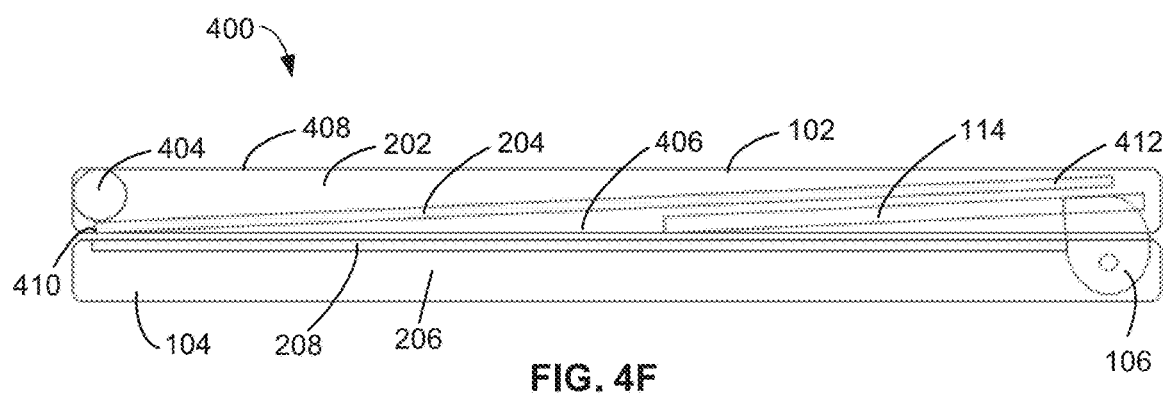
FIG. 4F is a schematic cross-sectional view of the device of FIG. 4A with the first display in a closed position with the physical keyboard coupled via a first type of hinge.

FIG. 4E is a cross-sectional view of the computing device 400 taken along the 4E-4E line of FIG. 4D. In FIG. 4E, the computing device 400 is in the open position, and the physical keyboard 114 is in the deployed position. FIG. 4F is a schematic cross-sectional view of the computing device 400 with the first display 102 in the closed position with the physical keyboard 114 coupled via first type of hinge 106. In this example, the physical keyboard 114 rotates relative to the first display 102 and the second display 104 about the same hinge 106 or a hinge aligned with the hinge 106 about which the first display 102 rotates relative to the second display 102 to open and close the computing device.

Figure 4G:
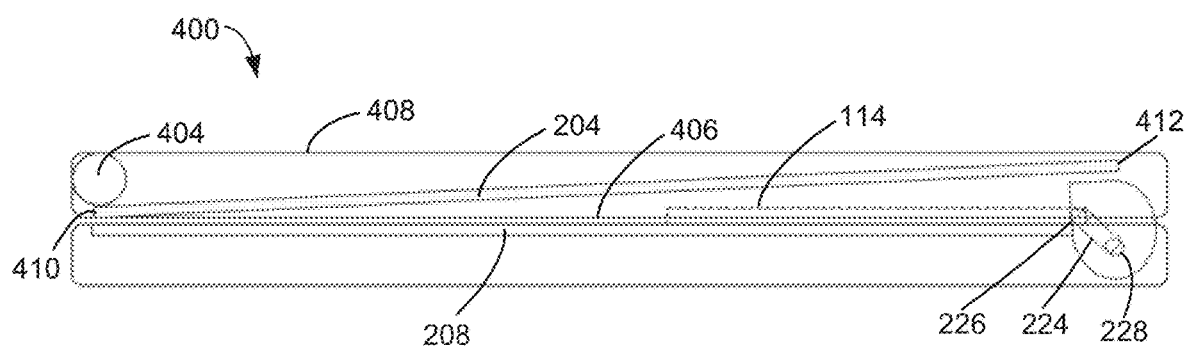
FIG. 4G is a schematic cross-sectional view of the device of FIG. 4A with the first display in a closed position with the physical keyboard coupled via a second type of hinge.

FIG. 4G is a schematic cross-sectional view of the computing device 400 with the first display 102 in a closed position and the physical keyboard 114 coupled via a second type of hinge. The hinge in FIG. 4G is a dual axis change that includes the linkage 224, the first hinge 226 to couple the physical keyboard 114 to the first display 102, and the second hinge 228 to couple the physical keyboard 114 to the second display 104. In some examples, the hinge of FIG. 4G that couples the physical keyboard 114 to the computing device 400 is a soft hinge.

The first screen 204 is positioned at an angle in the first cover 202 in the examples of FIGS. 4E-4G. For example, the first cover 202 includes a front face 406, which faces a user when the computing device 400 is in use (the open position), and a rear face 408, which faces away from the user when the computing device 400 is in use. The first screen 204 includes a top end 410 and a bottom end 412, the bottom end 412 is closer to the hinge 106 than the top end 410. With the angled position of the first screen 204, the top end 410 of the first screen 204 is closer to the front face 406 of the first cover 202 than to the rear face 408. The bottom end 412 of the first screen 204 is closer to the rear face 408 of the first cover 202 than to the front face 406. The angled position of the first screen 204 accommodates the physical keyboard 114 when the physical keyboard 114 is in a stowed position (FIG. 4F) and/or when the physical keyboard 114 is in a deployed position (FIG. 4G).

Figure 5A:
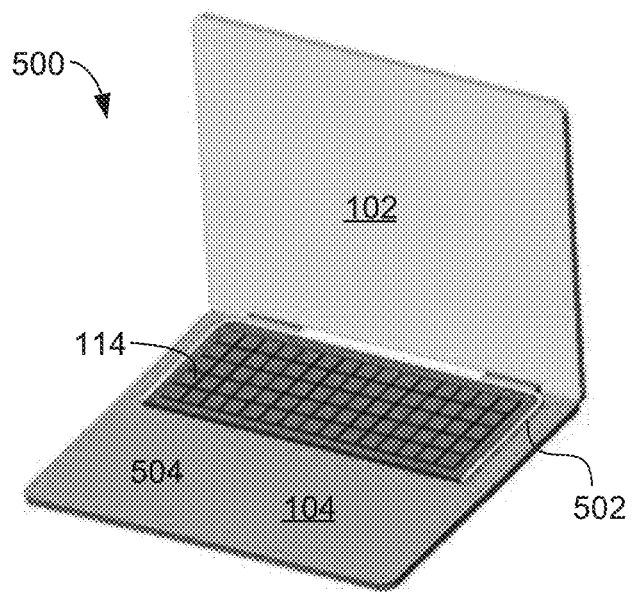
FIG. 5A is a schematic illustration of a front perspective view of an example dual display computing device with an example physical keyboard in accordance with the teachings of this disclosure where the computing device is in an open position and the keyboard is in a first deployed position.
Figure 5B:
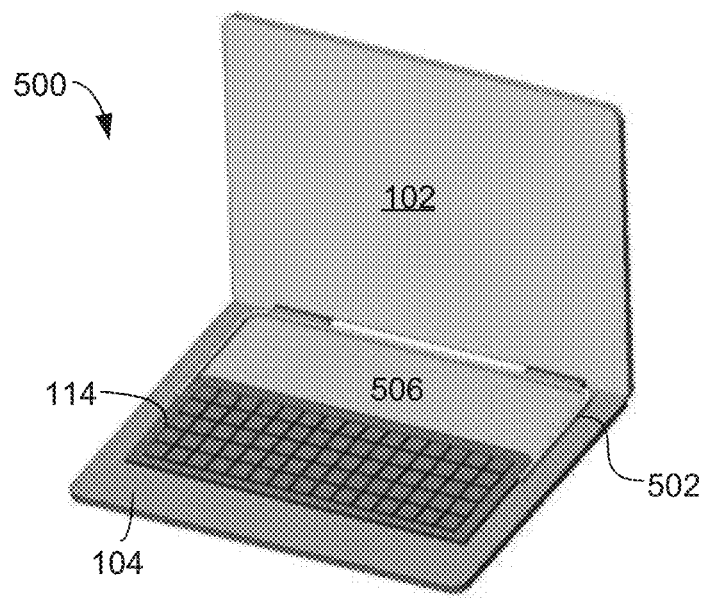
FIG. 5B is a schematic illustration of a front perspective view of an example dual display computing device with an example physical keyboard in accordance with the teachings of this disclosure where the computing device is in an open position and the keyboard is in a second deployed position.

FIGS. 5A and 5B are schematic illustrations of front perspective views of an example dual display computing device 500 with the physical keyboard 114 disposed in an example track 502. In FIG. 5A, the physical keyboard is in a first deployed position where the physical keyboard 114 is positioned closer to the first display 102 and the underlying support plate 108, 402 within the track 502. In FIG. 5B, the physical keyboard is in a second deployed position wherein the physical keyboard 114 has been slid in the track 502 closer to the user and away from the first display 102 and the underlying support plate 108, 402. The physical keyboard 114 may be positioned at any position between the two positions shown in FIGS. 5A and 5B, which gives the user greater flexibility regarding positioning of the physical keyboard 114 and comfort with use.

In some examples, a first area 504 of the second display 104 may present first content when the physical keyboard 114 is in the first position shown in FIG. 5A. In some examples, a second area 506 of the second display 104 may be present the first content or second content different than the first content when the physical keyboard is in the second position shown in FIG. 5B.

In some examples, the track 502 is a docking tray. In some examples, the docking tray includes a glass plate between the tracks 502 so that the second area 506 is visible when the physical keyboard is in the second position shown in FIG. 5B. In some examples, other items such as, for example, a pen, a flat mouse, etc. may be stored with the tracks 502 and/or docking tray.

In some examples, the physical keyboard 114 is transparent. The keys of the physical keyboard 114 may appear via one or more areas 504, 506 of the second display 104 and project up through the transparent, physical keyboard 114. In some examples, the keys may be customizable. In such examples, the users enjoy the benefits of the software enhanced or customizable keyboard along with the tactile satisfaction of a physical keyboard.

In some examples, the physical keyboard 114 is a wireless keyboard that communicates, for example, via Bluetooth technology. In some example, the physical keyboard 114 is completely removable and usable separate from the device disclosed herein. In such examples, the physical keyboard 114 can be used with devices that have two full displays.

Figure 6:
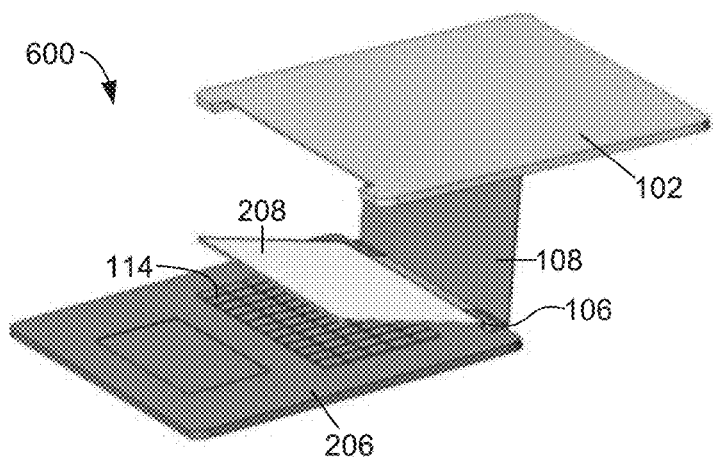
FIG. 6 is a schematic illustration of a front perspective view of an example dual display computing device with an example physical keyboard in accordance with the teachings of this disclosure where an example first display is in a partially rotated position to reveal an example second display that is rotated and illustrated between a stowed position and a deployed position.

FIG. 6 is a schematic illustration of a front perspective view of an example dual display computing device 600 with the physical keyboard 114 that provides a laptop first experience. In this example, the physical keyboard 114 is positioned in the second cover 206. The second screen 208 is rotatably coupled to the support plate 108 via the hinge 106. Thus, the second screen 208 is coupled between the first display 102 and the second cover 206 with the physical keyboard 114. In this example, the second screen 208 is stowable behind the first display 102. The first display is rotated about the support plate 108 to access the second screen 208. The second screen 208 is rotated about the hinge to deploy the second screen 208 when more screen space is desired.

Figure 7:
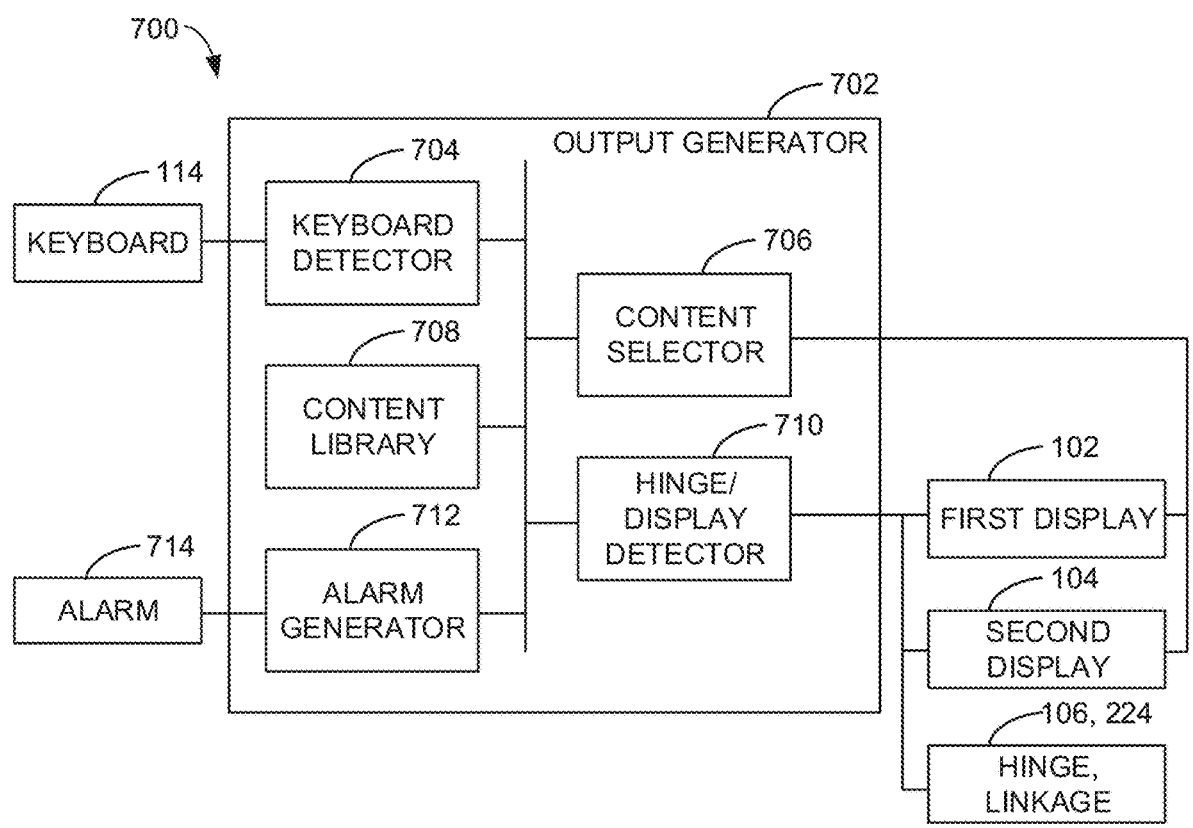
FIG. 7 is a block diagram of the example computing device and the example keyboard of any of FIGS. 1A-6.

FIG. 7 is a block diagram of an example computing device 700 that represents any of the example computing devices 100, 200, 300, 400, 500, 600 of any of FIGS. 1A-6. The computing device 700 includes the physical keyboard 114, the first display 102, the second display 104, and the hinge 106 and/or the linkage 224. The computing device 700 also includes an example output generator 702. The output generator 702 generates displays (including media content), interfaces, alarms, and other suitable output based on the position of one or more of the first screen display, the second screen display, the hinge 106 and/or linkage 224, and/or the physical keyboard 114.

The output generator 702 includes an example keyboard detector 704. The keyboard detector 704 includes a sensor. The keyboard detector 704 provides means for detecting the position or placement of the physical keyboard 114. For example, the keyboard detector 602 determines if the physical keyboard 114 is deployed or stowed, if the physical keyboard 114 is positioned on the second display 104 close to the hinge 106 as shown in FIG. 5A, if the physical keyboard 114 is positioned elsewhere on the second display 104. The keyboard detector 704 detects the position of the physical keyboard 114 off the second display 104 when the physical keyboard 114 is used separately from the computing device 700 as disclosed above.

The output generator 702 also includes an example content selector 706. The example content selector 706 provides means for selecting a content to display including, for example, a user interface. The content selector 706 selects the content based on the position of the physical keyboard 114 as indicated by the keyboard detector 704. The content selector 706 accesses a content library 708 to select content for presentation on the first screen 204 and/or the second screen 208. The content may include full screen displays, tool bars, emoji bars, touchpads, function keys, and/or any other suitable user interfacing and/or operating system functionality.

The output generator 702 also includes an example hinge/display detector 710. The hinge/display detector includes a sensor. The hinge/display detector 710 provides means for detecting a closed and/or stowed position of the computing device 700 and one or more of the open and/or deployed positions. The hinge/display detector 710 detects the position of the hinge 106, the position of the linkage 224, and/or the position of one or more of the first display 102 or the second display 104. The position of the first display 102, the second display 104, the hinge 106, the linkage 224, and/or the physical keyboard 114 is indicative of the operating mode of the electronic device including, for example, a laptop mode, a flat mode, a book mode, a tent mode, a tablet mode, a single screen mode, a multi-screen mode, or a power down and closed mode. The content selector 706 may select the content also based on the position of the first display 102, the second display 104, the hinge 106, the linkage 224, and/or the keyboard. In some examples, because of the relatedness of the position of the physical keyboard 114 and the position of the linkage 224, the functionality of the hinge/display detector 710 and the keyboard detector 704 may be combined. In some examples, the hinge/display detector 710 and the keyboard detector 704 operate in concert. In some examples, the output generator 702 places the computing device 700 in a single display and keyboard mode based on a detection by the keyboard detector 704 of the physical keyboard 114 on the second display 104. In some examples, the output generator 702 places the computing device 700 in a multi-display mode based on a lack of detection by the keyboard detector 704 of the physical keyboard 114 on the second display 104.

The output generator 702 also includes an example alarm generator 712. The example alarm generator 712 provides means for providing a notice or an alarm 714 based on the position of the physical keyboard 114 and the first display 102, the hinge 106, and/or the linkage 224. The alarm generator 712 uses data from the keyboard detector 704 and data from the hinge/display detector 710 to determine if the computing device 700 is in the closed position and if the physical keyboard 114 is deployed and positioned on the second display 104 or in a stowed position. If the hinge/display detector 710 detects that the hinge 106 and/or the first display 102 are in the closed position and/or moving toward the closed position, and the keyboard detector 704 detects that the physical keyboard 114 is deployed and located on the second display 104, the alarm generator 712 determines that the physical keyboard 114 is not properly stowed and generates the alarm 714 to warn about the inability to close the computing device 700. However, if the hinge/display detector 710 detects that the hinge 106 and/or the first display 102 are in the closed position or moving to the closed position, and the keyboard detector 704 detects that the physical keyboard 114 is stowed and not located on the second display 104, the alarm generator 712 determines that the physical keyboard 114 is properly stowed and does not generate the alarm 714.

While an example manner of implementing the computing devices 100, 200, 300, 400, 500, 600 of FIGS. 1A-6 is illustrated in FIG. 7, one or more of the elements, processes, and/or devices illustrated in FIG. 7 may be combined, divided, re-arranged, omitted, eliminated, and/or implemented in any other way. Further, the example keyboard detector 704, the examiner content selector 706, the example content library 708, the example hinge/display detector 710, the example alarm generator, and/or, more generally, the example output generator 702 of FIG. 7 may be implemented by hardware, software, firmware, and/or any combination of hardware, software, and/or firmware. Thus, for example, any of the example keyboard detector 704, the examiner content selector 706, the example content library 708, the example hinge/display detector 710, the example alarm generator, and/or, more generally, the example output generator 702 could be implemented by one or more analog or digital circuit(s), logic circuits, programmable processor(s), processor circuitry, programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example, keyboard detector 704, the examiner content selector 706, the example content library 708, the example hinge/display detector 710, the example alarm generator, and/or the example output generator 702 is/are hereby expressly defined to include a non-transitory computer readable storage device or storage disk such as a memory, a digital versatile disk (DVD), a compact disk (CD), a Blu-ray disk, etc. including the software and/or firmware. Further still, the example output generator 702 and/or the computing device 100 of FIG. 7 may include one or more elements, processes, and/or devices in addition to, or instead of, those illustrated in FIG. 7, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
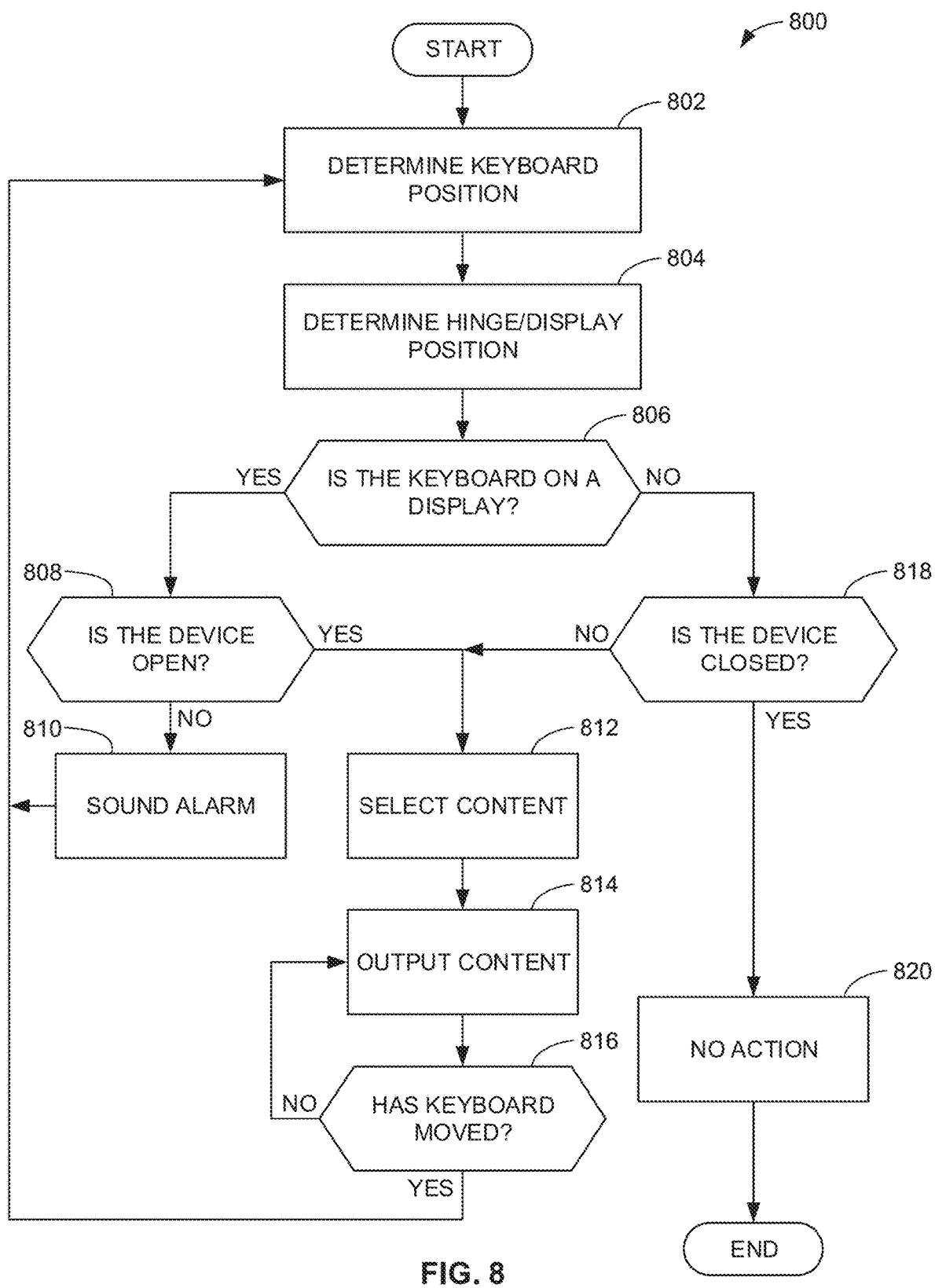
FIG. 8 is a flowchart representative of machine readable instructions which may be executed to implement the example computing device and the example keyboard of any of FIGS. 1A-7.

A flowchart representative of example hardware logic, machine readable instructions, hardware implemented state machines, and/or any combination thereof for implementing the output generator 705 of FIG. 7 is shown in FIG. 8. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example output generator 702 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device, and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects, and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

In execution of the program 800 of FIG. 8, the keyboard detector 704 of the output generator 702 determines the position of the physical keyboard 114 (block 802). In addition, the hinge/display detector 710 determines the position of one or more of the first display 102, the second display 104, the hinge 106 and/or the linkage 224 (block 804). The content selector 706 and the alarm generator 712 determine if the physical keyboard 114 is positioned in a deployed position on the second display 104 based on data from the keyboard detector 704 (block 806). In addition, the content selector 706 and the alarm generator 712 determine if the computing device 700 is in an open position based on the data from the hinge/display detector 710 (block 808).

If the physical keyboard 114 is located on the second display (block 806) and the computing electronic device 100 is not open (block 808) because, for example, the first display 102 is moving or has moved to a closed position, the alarm generator 712 sounds an alarm (block 812) to warn the user to stow the physical keyboard 114 prior to fully closing the computing device 700. The example program 800 then continues with the keyboard detector 704 detecting the position of the physical keyboard 114 (block 802) during a subsequent use of the computing device 700.

If the physical keyboard 114 is located on the second display (block 806) and the computing device 700 is open (block 808), the content selector 706 selects from the content library 708 what elements of a display, interface, and/or media content to present to the user based on the position of the physical keyboard 114 relative to the opened second display 104 (block 812). The content selector 706 outputs the content to the displays 102, 104 (block 614).

The keyboard detector 704 determines if the physical keyboard 114 has been moved (block 816). If the physical keyboard 114 has not been moved, the content selector 706 continues to output the selected content (block 814). If the keyboard detector 704 detects that the physical keyboard 114 has been moved, example program 800 then continues with the keyboard detector 704 detecting the position of the physical keyboard 114 (block 802).

Returning to block 806, if the content selector 706 and the alarm generator 712 determine that the physical keyboard 114 is not positioned on the second display 104 and is stowed based on data from the keyboard detector 704 (block 806), the content selector 706 and the alarm generator 712 determine if the computing device 700 is in a closed position based on the data from the hinge/display detector 710 (block 818).

If the physical keyboard 114 is not on the second display 104 and is stowed (block 806) and the computing device 700 is not in a closed position (block 818), the content selector 706 selects content for presentation on the displays 102, 104 (block 812). For example, the content selector 706 may select a two screen, full image display. The program 800 then continues as disclosed above.

If the physical keyboard 114 is not on the second display 104 and is stowed (block 806) and the computing device 700 is in a closed position (block 818), the content selector 706 takes no action because the computing device 700 is closed, and the alarm generator 712 takes no action because the physical keyboard 114 is properly stowed. The example program 800 then ends.

Figure 9:
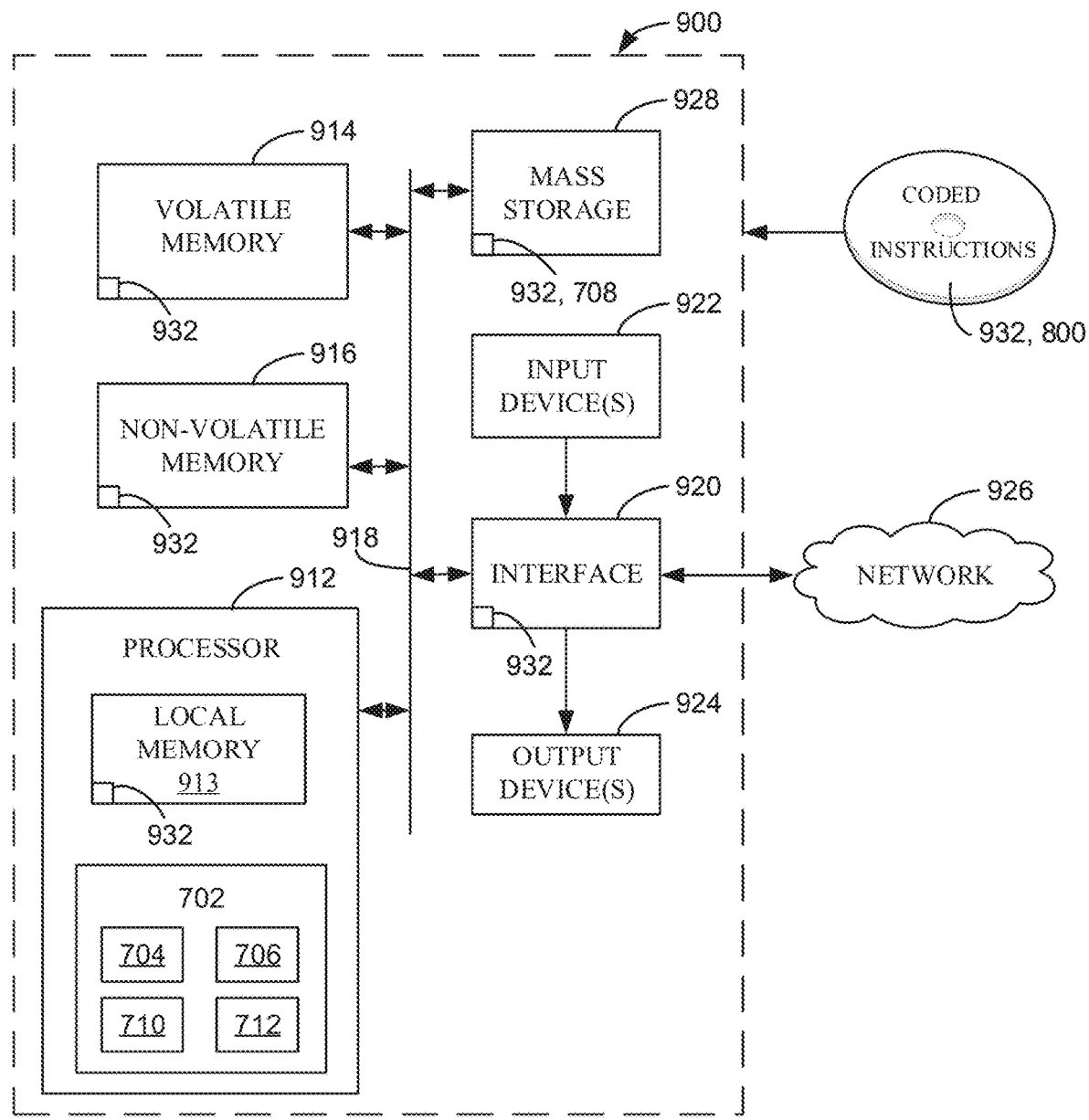
FIG. 9 is a block diagram of an example processing platform structured to execute the instructions of FIG. 8 to implement the example computing device and the example keyboard of any of FIGS. 1A-7.

FIG. 9 is a block diagram of an example processor platform 800 structured to execute the instructions of FIG. 8 to implement the output generator 702 of FIG. 7. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the output generator 702, the keyboard detector 704, the content selector 706, the hinge/display detector 710, and the alarm generator 712.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuit 920 of the illustrated example, thus, typically includes a graphics driver card, a graphics driver chip, and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 8 may be stored in the mass storage device 928, in the volatile memory 914, in the non-volatile memory 916, and/or on a removable non-transitory computer readable storage medium such as a CD or DVD.

From the foregoing, it will be appreciated that example apparatus, systems, articles of manufacture, and methods have been disclosed that include example hinges and support plates that enable a physical keyboard to be stowed between halves of a closed computing device with dual displays. A physical keyboard enhances the typing experience, and the example hinges and support plates disclosed herein enable a physical keyboard to become part of the computing device instead of requiring a user to acquire and carry a separate external keyboard accessory.

In examples disclosed herein, the physical keyboard is accessible based on user desire or interest. When the user is not operating the physical keyboard, the physical keyboard can be stowed and all the screen space is available for dual display usage.

In examples disclosed herein, the physical keyboard remains with the system (e.g., with the computing devices) and will not be lost. In addition, no extra space is needed to store the physical keyboards.

In examples disclosed herein, a user can convert between the dual screen or dual display mode with a stowed keyboard and a mode with a deployed keyboard without lifting the entire computing device. The conversion between modes can occur while the computing device is set on a surface and/or in a user's lap. The conversion is easily performed in crowded spaces such as, for example, on a train or an airplane.

The features of the different examples disclosed herein may be combined with features of other examples disclosed herein.

Example 1 disclosed herein is a computing device that includes a support plate; a first display hingedly coupled to the support plate; a physical keyboard hingedly coupled to the support plate; and a second display coupled to the first display.

Example 2 includes the computing device of Example 1, wherein the first display is coupled to the support plate at a first location, and the physical keyboard is coupled to the support plate at a second location, the second location closer to the second display than the first location.

Example 3 includes the computing device of Example 1, further including a cover, the cover including: the first display; and a cavity sized to stow the physical keyboard, the physical keyboard removably stowable in the cavity.

Example 4 includes the computing device of Example 3, wherein the first display is disposed on an angle within the cover.

Example 5 includes the computing device of Example 1, where the physical keyboard is hingedly coupled about an axis of rotation and the second display is hingedly coupled about the same axis of rotation.

Example 6 includes the computing device of Example 1, wherein the physical keyboard is hingedly coupled via a linkage, the linkage including a first axis of rotation and a second axis of rotation, the linkage rotatable relative to the second display about the first axis of rotation, the physical keyboard rotatable relative to the linkage about the second axis of rotation.

Example 7 includes the computing device of Example 6, wherein the first axis of rotation is stationary and the second axis of rotation is movable.

Example 8 includes the computing device of Example 7, wherein the second axis of rotation is in a first position when the first display is in an open position and the physical keyboard is in a stowed position, and the second axis of rotation is in a second position when the first display is in the open position and the physical keyboard is in a deployed position.

Example 9 includes the computing device of Example 8, wherein the second axis of rotation is in the first position when the first display is in a closed position and the physical keyboard is in a stowed position, and the second axis of rotation is in the second position when the first display is in the closed position and the physical keyboard is in a deployed position.

Example 10 includes the computing device of Example 1, wherein the first display is coupled to the second display via an intermediary panel, the first display rotatably coupled to a first end of the intermediary panel, the second display fixedly coupled to a second end of the intermediary panel.

Example 11 includes the computing device of Example 10, wherein the physical keyboard is rotatably coupled to the second end of the intermediary panel.

Example 12 includes the computing device of Example 1, wherein the first display is coupled to the second display via a dual axis link, the dual axis link including a first axis of rotation and a second axis of rotation, the dual axis link rotatable relative to the second display about the first axis of rotation, the first display rotatable relative to the dual axis link about the second axis of rotation.

Example 13 includes the computing device of Example 12, wherein the first axis of rotation is stationary and the second axis of rotation is movable.

Example 14 includes the computing device of Example 13, wherein the second axis of rotation is in a first position when the first display is in an open position, and the second axis of rotation is in a second position when the first display is in a closed position and the physical keyboard is in a deployed position.

Example 15 includes the computing device of Example 1, wherein the first display is hingedly coupled to the support plate at a top edge of the first display.

Example 16 includes the computing device of Example 1, further including a stopper on a first end of the physical keyboard, the stopper to engage the first display when the physical keyboard is in a deployed position and the first display is moved toward a closed position, the physical keyboard coupled to the support plate at a second end of the physical keyboard.

Example 17 includes the computing device of Example 1, further including a track, the physical keyboard disposed within the track, the physical keyboard slidably disposed in the track between a first position on or over the second display and a second position on or over the second display, the first position closer to the support plate than the second position.

Example 18 includes the computing device of Example 1, wherein the second display is coupled between the support plate and the physical keyboard.

Example 19 includes the computing device of Example 18, wherein the second display is movable between (1) a stowed position between the first display and the support plate and (2) a deployed position over or on the physical keyboard.

Example 20 includes the computing device of Example 1, further including a sensor to detect placement of the physical keyboard on the second display.

Example 21 includes the computing device of Example 20, further including a processor in communication with the sensor, the processor to place the computing device in a single display and keyboard mode when the sensor detects placement of the physical keyboard on the second display.

Example 22 includes the computing device of Example 20, further including a processor in communication with the sensor, the processor to place the computing device in a dual display mode when the sensor does not detect placement of the physical keyboard on the second display.

Example 23 includes the computing device of Example 22, wherein the processor is to disable the physical keyboard when the computing device is in the dual display mode.

Example 24 is a computing device that includes memory including machine readable instructions; and processor circuitry to execute the instructions to: detect placement of a keyboard on a display of a computing device having a plurality of displays; place the computing device in a single display and keyboard mode when the placement of the keyboard on the display is detected; and place the computing device in a multi-display mode when the placement of the keyboard on the display is not detected.

Example 25 includes the computing device of Example 24, wherein the processor circuitry is to execute instructions to disable the keyboard when the computing device is in the multi-display mode.

Although certain example methods, apparatus and articles of manufacture have been disclosed herein, the scope of coverage of this patent is not limited thereto. On the contrary, this patent covers all apparatus, devices, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A computing device comprising:
   a first display;
   a second display;
   a keyboard, the keyboard to rotate about an axis relative to the first display, and the second display to rotate about the axis relative to the first display, the keyboard and second display independently rotatable about the axis;
   machine readable instructions; and
   processor circuitry to execute the instructions to:
      place the computing device in a first mode when placement of the keyboard on the second display is detected; and
      place the computing device in a second mode when the placement of the keyboard on the first display or the second display is not detected.

2. The computing device of claim 1, wherein the keyboard is disabled when the computing device is in the second mode.

3. The computing device of claim 1, wherein the processor circuitry is to present function keys on the second display when the keyboard is on the second display.

4. The computing device of claim 1, wherein the processor circuitry is to present a touch pad on the second display when the keyboard is on the second display.

5. The computing device of claim 1, further including a hinge, the processor circuitry to set an operating mode of the computing device based on a position of the hinge.

6. The computing device of claim 5, wherein the processor circuitry is to select content to present on at least one of the first display or the second display based on the operating mode.

7. The computing device of claim 5, wherein the keyboard is coupled to at least one of the first display or the second display via the hinge.

8. The computing device of claim 1, further including a cover, the cover including:
   the first display; and
   a cavity sized to stow the keyboard, the keyboard removably stowable in the cavity.

9. The computing device of claim 8, wherein the cover has a front face facing the a user when the computing device is in an open position and a rear face facing away from the user when the computing device is in the open position, and the first display includes a top end and a bottom end, the bottom end closer to the hinge than the top end, the first display is supported on an angle within the cover such that one of the top end or the bottom end is positioned closer to the front face of the cover and the other of the top end or the bottom end is position closer to the rear face of the cover.

10. The computing device of claim 1, further including a stopper on a first end of the keyboard, the stopper to engage the first display when the keyboard is in a deployed position and the first display is moved toward a closed position, the keyboard coupled to at least one of the first display or the second display at a second end of the keyboard.

11. The computing device of claim 1, further including a track, the keyboard at least partially within the track, the physical keyboard slidable relative to the track between a first position on or over the second display and a second position on or over the second display.

12. A computing device comprising:
   a first display;
   a second display;
   a keyboard;
   a linkage, the keyboard coupled to the linkage, the linkage including a first axis of rotation and a second axis of rotation, the linkage rotatable relative to the second display about the first axis of rotation, the keyboard rotatable relative to the linkage about the second axis of rotation;
   machine readable instructions; and
   processor circuitry to execute the instructions to:
      place the computing device in a first mode when placement of the keyboard on the second display is detected; and
      place the computing device in a second mode when placement of the keyboard on the first display or the second display is not detected.

13. The computing device of claim 12, wherein the first axis of rotation is stationary and the second axis of rotation is movable.

14. The computing device of claim 13, wherein the second axis of rotation is in a first position when the first display is in an open position and the keyboard is in a stowed position, and the second axis of rotation is in a second position when the first display is in the open position and the keyboard is in a deployed position.

15. The computing device of claim 14, wherein the second axis of rotation is in the first position when the first display is in a closed position and the keyboard is in a stowed position, and the second axis of rotation is in the second position when the first display is in the closed position and the keyboard is in a deployed position.

16. The computing device of claim 12, further including: an intermediary panel, the second display coupled to the first display via the intermediary panel.

17. A computing device comprising:
memory;
machine readable instructions; and
processor circuitry to execute the instructions to:
    determine whether a keyboard partially covers a first one of a plurality of displays of the computing device;
    place the computing device in a first mode when the keyboard covers a first portion of the first display;
    present function keys on a second portion of the first display when the computing device is in the first mode; and
    place the computing device in a second mode when the keyboard does not partially cover the first display.

18. The computing device of claim 17, wherein the processor circuitry is to disable the keyboard when the computing device is in the second mode.

19. The computing device of claim 17, wherein the processor circuitry is to detect a position of a hinge of the computing device and place the computing device in the first mode or the second mode based on the position of the hinge.

20. The computing device of claim 19, wherein the processor circuitry is to disable the keyboard based on the position of the hinge.

21. A non-transitory machine readable medium comprising instructions that, when executed, cause one or more processors to:
detect a position of a hinge;
place a computing device having a first display and second display in a first operating mode when the hinge is in a first position;
place a physical keyboard in an enabled mode when the first display and the second display are in the first operating mode;
place the computing device in a second operating mode when the hinge is in a second position; and
place the keyboard in a disabled mode when the first display and the second display are in the second operating mode.

22. The computer machine readable medium of claim 21, wherein the instructions cause the one or more processors select content to present on at least one of the first display or the second display based on the operating mode.

* * * * *